(12) United States Patent  
Dec et al.

(10) Patent No.: US 7,128,046 B1
(45) Date of Patent: Oct. 31, 2006

(54) FUEL MIXTURE STRATIFICATION AS A METHOD FOR IMPROVING HOMOGENEOUS CHARGE COMPRESSION IGNITION ENGINE OPERATION

(75) Inventors: John E. Dec, Livermore, CA (US); Carl-Magnus G. Sjöberg, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 0 days.

(21) Appl. No.: 11/095,256

(22) Filed: Mar. 29, 2005

(51) Int. Cl.
*F02B 17/00* (2006.01)

(52) U.S. Cl. .................. 123/295; 123/299; 123/305

(58) Field of Classification Search ............. 123/295, 123/299, 305
See application file for complete search history.

(56) References Cited

U.S. PATENT DOCUMENTS

| | | | |
|---|---|---|---|
| 6,497,213 B1 * | 12/2002 | Yoshizawa et al. ......... | 123/299 |
| 6,619,255 B1 * | 9/2003 | Urushihara et al. ......... | 123/295 |
| 6,640,773 B1 * | 11/2003 | Ancimer et al. ............ | 123/299 |
| 6,994,072 B1 * | 2/2006 | Kuo et al. .................. | 123/295 |
| 2002/0078918 A1 * | 6/2002 | Ancimer et al. ............ | 123/295 |
| 2003/0233996 A1 * | 12/2003 | Marriott et al. ............. | 123/295 |
| 2004/0182359 A1 * | 9/2004 | Stewart et al. .............. | 123/295 |
| 2005/0092287 A1 * | 5/2005 | Tozzi et al. ................. | 123/305 |

OTHER PUBLICATIONS

Dec, J.E; Sjöberg, M.; "Isolating the Effects of Fuel Chemistry on Combustion Phasing in a HCCI Engine and the Potential of Fuel Stratification for Ignition Control," *2004 SAE World Congress*, Detroit, MI, Mar. 8-11, 2004, paper 2004-01-0557.

* cited by examiner

*Primary Examiner*—Erick Solis
(74) *Attorney, Agent, or Firm*—Donald A. Nissen

(57) ABSTRACT

A method for slowing the heat-release rate in homogeneous charge compression ignition ("HCCI") engines that allows operation without excessive knock at higher engine loads than are possible with conventional HCCI. This method comprises injecting a fuel charge in a manner that creates a stratified fuel charge in the engine cylinder to provide a range of fuel concentrations in the in-cylinder gases (typically with enough oxygen for complete combustion) using a fuel with two-stage ignition fuel having appropriate cool-flame chemistry so that regions of different fuel concentrations autoignite sequentially.

14 Claims, 2 Drawing Sheets

FUEL MIXTURE STRATIFICATION AS A METHOD FOR IMPROVING HOMOGENEOUS CHARGE COMPRESSION IGNITION ENGINE OPERATION

STATEMENT OF GOVERNMENT INTEREST

This invention was made with Government support under contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

CROSS-REFERENCE TO RELATED APPLICATIONS

Not applicable.

FIELD OF THE INVENTION

The present invention is directed to a method for improving operation of homogeneous charge compression ignition engines to slow the heat release rate to allow high load operation by providing a stratified fuel charge, wherein the fuel has a two-stage ignition chemistry, thereby controlling the heat release rate through sequential autoignition of regions with different concentrations. The stratified fuel charge can correspond to a range of equivalence ratios ($\phi$).

BACKGROUND OF THE INVENTION

Diesel engines have been faced with increasingly stringent emissions requirements for more than a decade. Despite substantial improvements, new emissions standards scheduled to take effect in 2007–2010 will require approximately another order of magnitude reduction in both nitrogen oxides ("$NO_x$") and particulate matter ("PM") emissions. These new standards are challenging and will likely require a combination of strategies including development of advanced combustion systems to reduce engine-out emissions (i.e., emissions prior to after treatment), development of adequate, reliable and cost-effective aftertreatment systems, and improvements in the coupling between engine and aftertreatment systems operation.

Homogeneous charge compression ignition ("HCCI") is an attractive advanced combustion process that offers potential as a high-efficiency alternative to spark ignition engines. By providing diesel-like efficiencies but with substantially lower $NO_x$ and PM emissions, HCCI also offers a low emissions alternative to diesel engines. Unlike conventional diesel combustion, HCCI does not rely on maintaining a flame front. Rather, combustion occurs as the result of spontaneous auto-ignition at multiple points throughout the volume of charge gas. This unique property of HCCI allows the combustion of very lean mixtures or mixtures that are made very dilute by the addition of combustion-product gases (e.g., by exhaust gas recirculation), resulting in low combustion temperatures that dramatically reduce $NO_x$ emissions. Also, unlike conventional diesel combustion, the charge is sufficiently well-mixed so that PM emissions are very low. Consequently, HCCI provides a low emissions alternative to conventional diesel engines.

Although the use of conventional diesel fuel or gasoline for HCCI would be desirable since these fuels are readily available, achieving acceptable HCCI with these fuels can be difficult. With diesel fuel, elevated temperatures are required before significant vaporization occurs making it difficult to form a premixed near-homogeneous charge. Second, diesel fuel has significant cool-combustion chemistry leading to rapid auto-ignition once compression temperatures exceed about 800° K. This can lead to overly advanced combustion phasing and/or require reduced compression ratios that reduce engine efficiency. Conversely, gasoline can require overly high compression ratios or various techniques to provide significant charge heating.

Currently, the power output of HCCI engines using diesel fuel or gasoline is limited to about half the that of traditional diesel engines. Extending HCCI operation to higher power outputs remains a significant challenge. This is mainly because the reaction rates with HCCI become very rapid as the fueling rate is increased causing engine knock that results in undesirable noise and reduced durability. Because high-load operation is a challenge, most HCCI concepts currently being pursued utilize HCCI only below about half load and revert to conventional spark ignition or diesel combustion for high loads. Thus, at present the advantages afforded by HCCI are limited to only part of the operating range.

Finally, it is widely recognized in the art that the charge in an HCCI engine is never fully homogeneous (in both temperature and mixture) in practical application. In some applications, such as diesel-fueled HCCI, there can substantial mixture inhomogeneities. However, the term HCCI is commonly used to refer to all cases where the charge is sufficiently premixed to achieve low $NO_x$ and PM emissions due to a quasi-volumetric, low-temperature combustion of a dilute charge. Therefore, hereinafter the term "homogeneous" in reference to homogeneous charge compression ignition (i.e., HCCI) can refer to a fuel charge that can be substantially inhomogeneous. Further, the term "fuel charge" will mean the product resulting from combining fuel plus air plus residual gases and/or combustion products or any combination thereof.

SUMMARY OF THE INVENTION

The invention is directed to a method for operating an HCCI engine to improve efficiency, wherein the rate of combustion is lowered i.e., the heat release rate is slowed, by means of fuel charge stratification, thereby extending the high-load operating limit to allow hitherto unattainable high-load operation. Moreover, the invention allows operation without excessive knock at higher engine loads than are possible with conventional HCCI.

In accordance with the invention, controlled fuel stratification is used to produce a range of fuel concentrations through appropriate fuel injection and in-cylinder mixing combined with a fuel having proper ignition characteristics, including a two-stage ignition with an appropriate ratio of first- and second-stage heat release and an appropriate volatility to achieve the desired mixture stratification.

DETAILED DESCRIPTION OF THE INVENTION

The present invention is directed to a method for improving the operation of internal combustion engines, and particularly homogeneous charge compression engines, by fuel/air mixture stratification (or fuel/air/residual fuel mixture stratification), including introducing a range of fuel/air (or fuel/air/combustion residuals) mixtures that autoignite sequentially during engine operation, to smooth the combustion heat release rate. Application of the inventive method disclosed herein provides for operation of HCCI engines at higher loads, substantially reducing or even eliminating the need to revert to traditional combustion modes, thereby reducing fuel consumption over a typical driving cycle and/or minimizing emissions of both $NO_x$ and PM. In this application, HCCI refers to any engine or combustion process in which a substantial majority of the fuel charge is premixed with air or combustion product gases (combustion residuals) to a degree sufficient for compression-induced combustion to occur a multiple locations throughout the premixed charge volume.

For simplicity, the following discussion is given in terms of an engine with very low combustion residuals and no exhaust gas recirculation ("EGR"), so that the fuel charge mixture consists almost entirely of fuel and air. Thus, changes in the fuel concentration and fuel stratification are synonymous with change in equivalence ratio and equivalence-ratio stratification. However, it is recognized that similar variation in the combustion behavior can be achieved when the fuel charge is diluted with combustion residuals or EGR. In these cases, the equivalence ratio (defined below) can vary independently of the fuel concentration, but the ignition timing of various portions of the charge will still vary with the local fuel concentration for a fuel with appropriate ignition characteristics.

Figure 1:
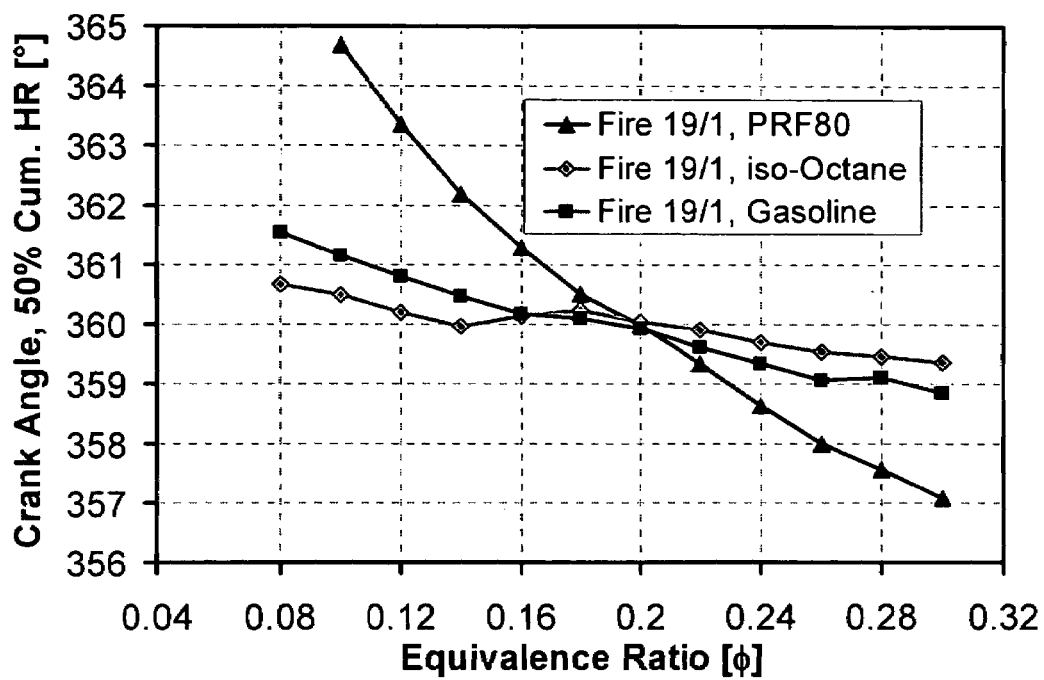
FIG. 1 is a graph that shows experimentally measured changes in combustion phasing with changes in equivalence ratio ($\phi$) for three fuel types.
Figure 2:
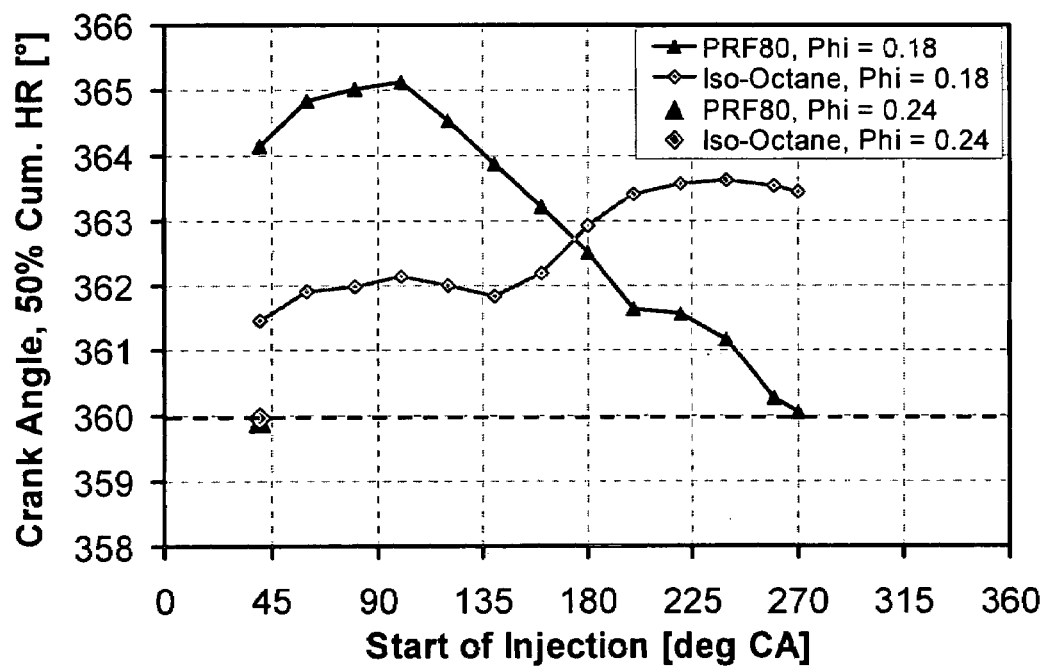
FIG. 2 is a graph showing measured changes in combustion phasing induced by retarding the injection timing causing charge stratification.

For mixture stratification to affect the combustion heat release rate, the chemical kinetic rates of autoignition of the fuel must vary with changes in the fuel/air mixture, i.e., the equivalence ratio $\phi$, which is defined by $(F/A)/(F/A)_{stoichiometric}$, wherein F is the concentration of fuel and A is the concentration of air. FIG. 1 shows the combustion phasing for three fuels as a function of $\phi$ for a well-mixed fuel/air charge. These data were acquired in such a manner as to isolate fuel chemistry effects from effects due to changes in wall heating and residual temperature and they show that the crank angle 50% burn point or centroid of the heat release is only slightly affected by changes in $\phi$ for iso-octane and gasoline which are single-stage ignition fuels (J. E. Dec and M. Sjöberg, *Isolating the Effects of Fuel Chemistry on Combustion Phasing in a HCCI Engine and the Potential of Fuel Stratification for Ignition Control*, 2004 SAE World Congress Detroit, Mich., Mar. 8–11, 2004, paper 2004-01-0557, herein incorporated by reference). In this discussion of the invention, crank angle ("CA") is defined as degrees of crank shaft rotation after piston top dead center during that part of the engine cycle separating the piston exhaust and intake strokes. However, for other fuels such as PRF80 (a mixture of Primary Reference Fuels comprising 80% iso-octane and 20% n-heptane by volume) changes in +cause large changes in combustion phasing (50% burn point). This is related to the cool-flame chemistry that occurs early in the autoignition process causing a two-stage ignition in PRF80 under these conditions. The intensity of the cool-flame chemistry is strongly related to the concentration of the fuel in the mixture, i.e., the equivalence ratio. For other fuels that have more cool-flame activity than PRF80, it is believed that an even larger shift in phasing could be achieved, but the amount of cool-flame chemistry that the fuel exhibits must be balanced against the possibility of overly advanced combustion phasing and engine design parameters such as the compression ratio. Because the results shown in FIG. 1 are independent of changes in wall temperature and residuals they can be thought of as also representing the behavior of localized fuel/air packets within a stratified fuel charge. This leads to two important conclusions for a two-stage ignition fuel. First, it should be possible to advance ignition timing by concentrating the fuel in part of the combustion chamber, thereby raising the local equivalence ratio for the same total fuel supplied. As shown in FIG. 2, this can be achieved by using a gasoline-type direct injector ("GDI") to vary the local equivalence ratio. With early injection of PRF80 (40° CA), the fuel charge was well-mixed and the 50% burn point occurs at 364° CA or 4° aTDC ("after top dead center"). However, as the injection timing is progressively retarded, the fuel has less time to mix with the air and a locally richer mixture is produced. These richer mixtures autoignite earlier (cf. FIG. 1). As shown in FIG. 2, this effect is sufficiently strong that with a fuel injection timing of 270° CA (half-way up the compression stroke) the local value of $\phi$ is sufficiently rich for combustion to be advanced by 4 degrees such that it occurs at top dead center ("TDC"). It should be noted that the experimental data shown in FIG. 2 were carried out to a CA of 315°. In contrast, for a single-stage ignition fuel, such as iso-octane, the effect of increasing the local value of $\phi$ is so weak (cf. FIG. 1) that it cannot overcome the effects of additional local charge cooling due to fuel vaporization, and combustion becomes more retarded.

The second conclusion that can be drawn from FIG. 1 is that by creating a properly stratified charge containing an appropriate range of equivalence ratios different parts of the fuel charge can be made to autoignite at different crank angles. This sequential autoignition of zones with different $\phi$ will significantly slow the overall heat release rate allowing HCCI operation at higher loads without knock. The second conclusion provides support for the current invention.

It will be appreciated by those skilled in the art that the necessary charge stratification can be achieved by various fuel-injection and/or in-cylinder cylinder mixing techniques. One straightforward method is to use multiple injections from a GDI fuel injector. By way of example, by injecting a portion of a fuel charge in an early part of the engine cycle, e.g., 40°–90° CA, a uniform, lean mixture would be formed that would autoignite after TDC, in a similar fashion to the $\phi=0.18$ data shown in FIG. 2 for PRF80. By injecting the remainder of the fuel later in the cycle, e.g., 225°–270° CA, a locally richer mixture would be formed that would autoignite several degrees earlier, at about TDC. In this way, the heat-release duration would be increased relative to a well-mixed charge in which all the fuel ignites at nearly same time. Consequently, the heat release would be significantly smoother. The heat release rate could be further smoothed by multiple fuel injections that are designed to create a wider distribution of fuel/air mixtures and hence ignition timings. The invention contemplates that other types of fuel injectors could also be used, and that the injection system could be coupled with appropriate changes to the in-cylinder flow field and combustion chamber geometry to more optimally control the fuel/air mixture. The desired stratification could also be achieved by controlled mixing of various charge gases, such as incomplete mixing of EGR, residual combustion gases, or air with an initially premixed or partially premixed fuel/air mixture. The invention also contemplates that a variety of different fuels or fuel blends could be used since the amount of first- and second-stage heat release exhibited by a fuel can vary with engine parameters such as the compression ratio, the temperature of the gases in the cylinder at the start of compression, and the amount of intake-pressure boost. These fuels could include, but are not limited to, diesel fuel, kerosene, jet fuels, gasoline, or other fuels derived from petroleum or non-petroleum feed stocks.

Figure 3:
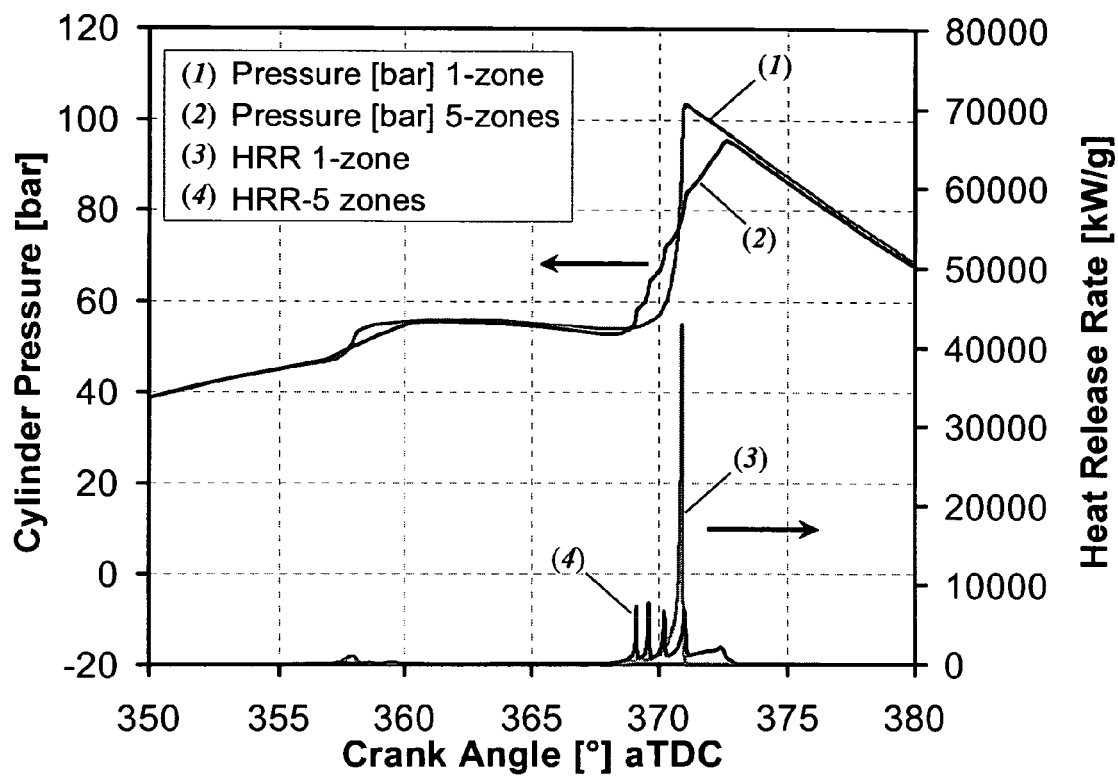
FIG. 3 shows model simulations of the effect of charge-mixture stratification to provide a range of equivalence ratios ($\phi$) for PRF50 fuel at 1200 rpm.

As a further demonstration of the invention, the applicants have shown the efficacy of the invention by means of multi-zone chemical kinetic calculations. FIG. 3 shows a comparison, using PRF50 fuel (50% iso-octane and 50% n-heptane), between a uniform mixture (1-zone/curve 1) and a stratified charge containing regions with different local equivalence ratios (5-zones/curve 2). These computations are for an average fueling rate of $\phi=0.45$, a relatively high load for HCCI engines. For the well-mixed case, the computations were initialized with the entire charge being $\phi=0.45$, whereas for the stratified case, each of the five zones was initialized with a different $\phi$ ranging from 0.35 to 0.61. The proportion of the charge mass in each zone was also adjusted so that the mass-weighted average $\phi$ was 0.45, the same as for the single-zone case. In both cases, the mixture is compressed to autoignition at a rate matching the piston motion that would be experienced in an engine running at 1200 rpm. The 50% burn point for both conditions was set at about 371° CA (11° aTDC), a typical combustion phasing for higher load HCCI operation. As can be seen from examination of FIG. 3, for the well-mixed case (curve 3), the heat release rate ("HRR") is very high causing a rapid pressure rise. On the other hand, the mixture-stratified case (curve 4) has a greatly reduced HRR with a commensurate reduction in the rate of pressure rise.

It is well known in the art that as load is increased in HCCI engines the heat release rate becomes more rapid which, in turn, increase the rate of cylinder pressure rise during combustion. When the pressure-rise rate become too rapid, a resonant acoustic wave occurs in the engine cylinder, which is the phenomenon commonly known as engine knock. Knock creates unacceptable noise levels and can lead to engine damage. If fueling is increased beyond the onset of knock, the strength of the acoustic wave (knock strength) and its propensity to cause engine damage increase rapidly.

The fueling rate (equivalence ratio) at which knock becomes unacceptable for an HCCI engine with a well-mixed charge will vary somewhat with the specific engine considered, the engine speed, the combustion-phasing control mechanism employed, and the amount of knock considered tolerable. One of the reasons for this variation is that retarding the combustion phasing can reduce the magnitude of the pressure-rise rate for a given $\phi$. However, the amount of timing retardation is limited because eventually combustion becomes unstable from cycle to cycle and/or steady combustion phasing cannot be maintained. The amount that the combustion can be retarded while maintaining good combustion stability varies between engines and control systems. A typical upper load limit for robust combustion-phasing control at a speed of 1200 rpm is a fueling rate corresponding to $\phi=0.35$ for a low-residual HCCI engine. The equivalence ratio will, of course, be higher for the same fueling rate when EGR or combustion residuals are used for the diluent. With a temperature control system that can precisely control the initial charge temperature, this number can be pushed higher, on the order of $\phi=0.4$ or a little above.

The present invention applies to extending the load range beyond these fueling rates, with the amount of charge-mixture stratification required being dependent on the fueling rate and other parameters. For loads just above the knock limit, only small a variation in equivalence ratio is required, but as the fueling rate is increased, stratification must be adjusted to produce a greater range of equivalence ratios throughout the charge, thereby spreading the heat release out over more crank angles. The stratification shown in FIG. 3 (a distribution from $\phi=0.35$ to 0.61 for an average fueling of $\phi=0.45$) slows the pressure rise rate significantly and is thought to be representative of a typical charge stratification that might be applied to prevent knock at $\phi=0.45$ with a combustion phasing where robust phasing control is still possible.

In practice, the amount of stratification required to prevent knock will depend on other factors besides the fueling rate. These include, but are not limited to, the engine speed, intake-pressure boost, the degree to which the charge becomes thermally stratified by heat transfer and other phenomena, the coupling between this thermal stratification and the mixture stratification, and the fuel composition. However, the present invention involves a flexible process, and the amount of charge stratification can be adjusted by variations in fuel injection and in-cylinder mixing processes to an amount appropriate for the current combustion conditions. Furthermore, even though the technique could apply to virtually any two-stage-ignition fuel, it is anticipated that fuel properties/specifications, including two-stage ignition behavior and fuel volatility, would evolve to enhance the performance of the technique.

Overall, this invention will significantly increase the high-load limit of HCCI engines. For some applications, this allows the HCCI process to be used without reverting to conventional diesel or spark-ignition combustion. For other applications, transitioning to conventional combustion may still be required at the highest loads, but the invention would allow the benefits of HCCI to be extended over a larger portion of the engine operating map, thereby increasing the likelihood of HCCI being implemented and its benefits realized. Finally, the invention is compatible with intake-pressure boosting (i.e., turbocharging or supercharging), which is used extensively to meet the high-power demands of modern engines, particularly diesels. Combining the fueling rate increases allowed by the invention with sufficient intake boosting it is possible that even the high power demands of heavy-duty engines could be achieved with HCCI.

We claim:

1. A method for slowing the heat release rate in a homogeneous charge compression ignition (HCCI) engine to prevent knock at high loads, comprising supplying a liquid fuel to the HCCI engine in such a manner that a stratified fuel charge is created, wherein the stratified fuel charge comprises a range of fuel concentrations and wherein the fuel has two-stage autoignition chemistry so that regions of the stratified fuel charge having different fuel concentrations autoignite sequentially.

2. The method of claim 1, wherein the stratified fuel charge comprises a mixture of fuel and air, or a mixture of fuel, air, and one or more residual gas.

3. The method of claim 1, wherein the stratified fuel charge contains a plurality of zones.

4. The method of claim 3, wherein each of said plurality of zones comprises an equivalence ratio which is either fuel lean, stoichiometric, or fuel rich.

5. The method of claim 1, wherein the stratified fuel charge provides for sequential autoignition.

6. The method of claim 1, wherein the step of supplying a liquid fuel comprises multiple injections separated in time.

7. The method of claim 1, wherein the step of supplying a liquid fuel comprises a time-varying rate of fuel injection.

8. The method of claim 1, wherein the composition of the stratified fuel charge changes with time.

9. The method of claim 1, wherein the fuel is derived from different fuel stocks.

10. The method of claim 1, wherein the stratified fuel charge is provided by a charge-gas mixing technique selected from the group consisting of incomplete mixing of different intake streams, incomplete mixing of a fuel/air mixture with residual gases, incomplete mixing of a fuel/air mixture with recirculated exhaust gas, incomplete mixing of a fuel/air mixture with additional air, incomplete mixing of a fuel/air mixture with additional premixed fuel and air and combinations of these charge-gas mixing techniques.

11. The method of claim 10, further including combining the charge-gas mixing technique or techniques with fuel injection.

12. The method of claim 10, wherein the charge-gas mixing technique or techniques include using a non-conventional engine-valve timing technique.

13. The method of claim 1, further including intake-pressure boosting.

14. An HCCI engine that operates in accordance with the method of claim 1.

* * * * *